2 Sheets--Sheet 1.

L. G. CLOCK.
Heel-Trimming Machine.

No. 169,149.  Patented Oct. 26, 1875.

WITNESSES
Frank G. Parker
F. F. Raymond

Lewis G. Clock INVENTOR

UNITED STATES PATENT OFFICE.

LEWIS G. CLOCK, OF BOSTON, MASSACHUSETTS.

IMPROVEMENT IN HEEL-TRIMMING MACHINES.

Specification forming part of Letters Patent No. 169,149, dated October 26, 1875; application filed August 20, 1875.

*To all whom it may concern:*

Be it known that I, LEWIS G. CLOCK, of Boston, Massachusetts, have invented an Improvement in Heel-Trimming Machines, of which the following is a specification:

This invention consists in an improved mechanism for trimming the heels of boots or shoes, consisting of a revolving circular knife and suitable devices for presenting the work to the knife gradually, continuously, and automatically, all capable of easy adjustment for varying sizes, thicknesses, and slopes of work, as will be hereinafter explained by the aid of the accompanying drawings, forming a part of this specification.

Like figures of reference indicate like parts in the accompanying drawings.

Figure 1:
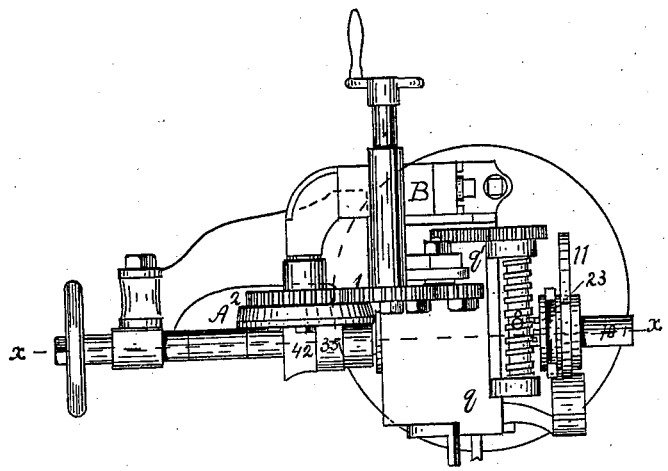
Figure 2:
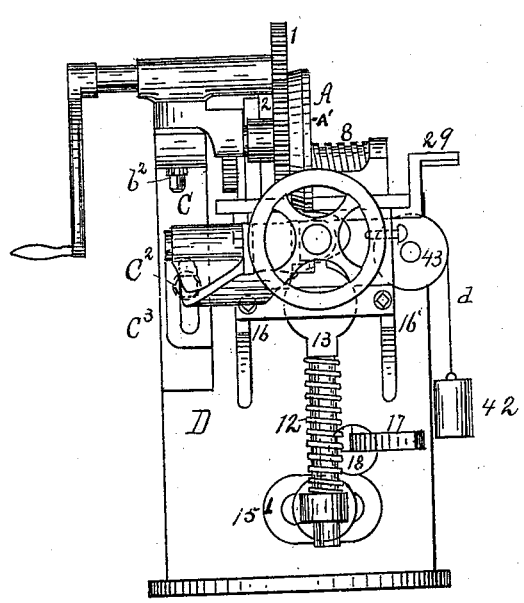
Figure 3:
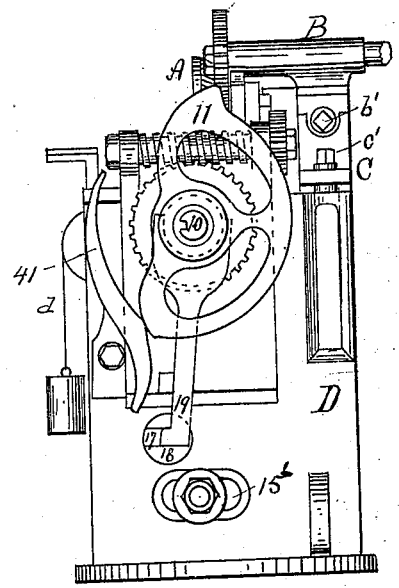

Figure 1 is a plan of the top of the machine. Figs. 2 and 3 are side plans diametrically opposite each other, and Fig. 4 is a vertical cross-section on the line $x\,x$ in Fig. 1.

Figure 4:
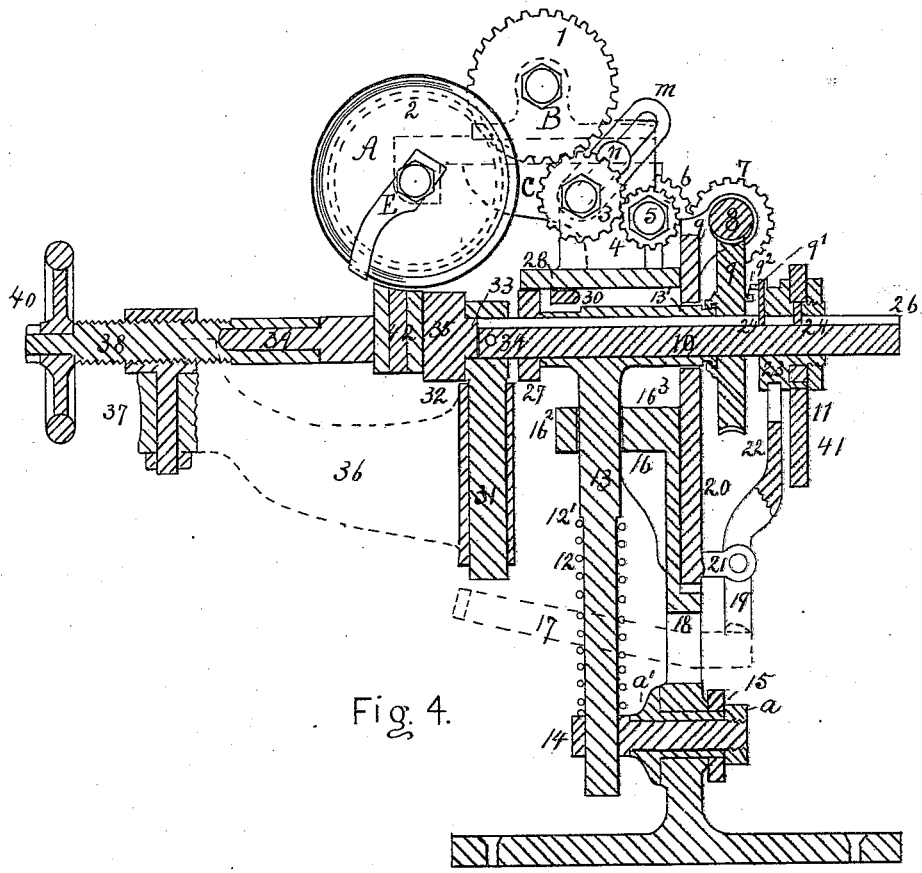

The power operating the varying mechanism, as will be readily seen, acts through the cog-wheel 1, as shown at the top of the drawing in Fig. 4, in revolving the knife A, by driving the cog-wheel 2, arranged on the same shaft with the knife, and immediately behind it, and, also, through the train of gears, the adjustable cog-wheel 3, actuating the intermediate cog-wheel 4, shaft 5, cog-wheel 6, and cog-wheel 7, to the driving-screw 8, operating the cog-wheel 9, which plays on the rock-shaft 13, and with the pins $9'$, or suitable gearing on the side thereof actuates the cam 11 on the main shaft 10. By the medium of the cog-wheels, shaft, and screw-gearing the power is thus transmitted to the guiding-cam 11 and the shaft 10, which carries the work to the revolving knife. This shaft 10 is hung on the rock-shaft 13, which is floated on spring 12, for purposes of adjustment, as will be hereafter explained, surrounding the same, with its upper bearing against the shoulder $12'$, near the head of the rock-shaft, and its lower end resting on the rocking bolt 14, which carries the rock-shaft, and allows a vertical movement thereof, and is adjusted, as desired, in the slot $15'$ in the frame-work of the machine, by being bolted by nut $a$ to the sleeve $a'$, clamped by nut 15, as shown. The brackets 16 $16^1$ carry a cross-bar, $16^2$, which supports and guides the rock-shaft, carrying the main shaft in its movement to and from the revolving knife, and which is bolted to the brackets by bolts, and the projecting ledge $16^3$, between the brackets 16 $16^1$, furnishes a guide on the frame-work of the machine for the same purpose. The lever 17, passing through the enlarged hole 18 in the frame of the machine, with the lever 19 pivoted to the sliding bearing-plate 20 at 21, and provided with a shipper, 22, engages with the clutch 23 on the main shaft, and serves to disconnect the cam 11 from the operating gearing on the side of cog-wheel. This clutch engages with the pin $9'$ on the side of cog-wheel 9, and serves as a bearing for the cam 11, fastened thereon by a nut, and is provided with the keys or guides 24, which slide in the keyway 26 on the face of shaft 10. The size and general conformation of the work is regulated by the heel-shaped cam or pattern 27, adjusted on the main shaft to act against the plate 28 of the machine as a guide, and a rocking lever and arm, 29 and 30, provide the necessary means for lowering the main shaft to facilitate its setting. The arm 31 is secured to the end of the main shaft by the pin 32, and projects at right angles from it, leaving sufficient space, however, for the insertion of the shoulder 34 on the pattern 35; projecting from arm 31 in the bracket 36, carrying the bolt with the screw-head 37, in which plays the screw 38, operating the spindle 39, which presses the work 42 against the face of the pattern 35 at the end of the main shaft. A hand-wheel, 40, on the end of the screw operates the same. The cam 11, which operates the main shaft, and guides the work in its peculiar presentation to the revolving knife, bears upon the S-shaped guide, which is bolted to the frame-work of the machine.

The gearing is capable of variations or adjustments for the purposes of regulating the speed of the parts in their relation to each other, and also to present the work to be dressed to the knife at any desirable angle to form a slope corresponding to the style and size of heel operated upon. Thus the bracket C carrying the plate B, which furnishes the bearings for the shafts carrying cog-wheel 1 and cog-wheel 2, and the knife A, and which is itself capable of horizontal adjustment on the same by the screws $b^1$ $b^2$ and slot $b^3$, is adjusted vertically by the screws $c^1$ $c^2$, and slot $c^3$ on the standard D, forming the framework. The sliding bearing $m$ and screw $n$ regulate the position of cog-wheel 3. The position of the wheels 4 and 6, and shaft 5, are absolute in their bearings, being fixed in the standard. The screw-gearing, consisting of cogs 7 and 9, and driving-screw 8, holds a variable relation to the cog operating the same, dependent upon the size of the work operated upon. The brackets $g$ $g'$ furnishing the bearings for the shaft 8, are bolted to the sliding bearing-plate 20, which rises and falls with the compensating movement of the rock-shaft, which has a bearing therein, at $12^1$, in its movement to and from the knife. This end of the rock-shaft, which projects through the sliding bearing-plate and surrounds the main shaft, furnishes the bearing for the cog 9; and this cog 9, by the gearing $9^2$ on its side and on the side of the clutch-wheel, communicates the power to the guiding-cam 11, which, while it bears the work against the knife in a manner consequent upon its peculiar shape, yet serves to turn and guide work of any size when regulated by the heel-pattern 27, that it may have a regular and uniform finish, the slope of the cut being regulated by the adjustment of the knife A. A weight, 42, suspended over wheel 43, attached to the frame of the machine by the cord $d$, which is fastened to the head of the rock-shaft 13, serves to draw the same back into position for renewing the work when the cam and clutch are forced from gear by the action of the levers 17 19. A guard, E, shaped to conform to the inner surfaces of the circular knife A, is bolted to the knife-shaft, and serves to free the blade from the leather skivings. The outer edge of the knife is beveled, as shown at A'.

The operation of the machine is as follows: The shaft 10 is lowered by the lever 29, and the heel-cam 27 secured thereon in any suitable manner. The lever is then reversed, and, by the action of the spring 12, the heel-cam is forced into position against the under side of plate 28, which acts as a guide. The work is then secured in the jack with the bottom of the heel resting on the heel-shaped block 35, a trifle less in size than the bottom of the heel to be finished. The power is then communicated to the machine, and the work gradually and regularly presented to the revolving circular knife A, which commences to cut upon the right upper surface of the heel, and by the peculiar formation of the cam 11, and its accompanying guide, and by the regulated size of the work to be done by the heel-cam, is evenly and uniformly dressed around a center, at first advancing with the work, gradually becoming stationary, while the outer surface revolves with as great a degree of speed until the heel is rounded at the back, and again gradually returning with increasing speed until the work is finished. The work is then removed, the machine thrown out of gear by the action of the levers 17 19, and the clutch, gear-wheel, cam, and the rock-shaft drawn back by the weight 42.

By this arrangement of parts and their relative adjustment, as provided for, heels of any size may be dressed with ease and facility, the peculiar action of the continuous knife upon the work making a smooth finish and a graceful shape to the completed heel.

Having thus fully described my invention, I claim and desire to secure by Letters Patent of the United States—

1. In machinery for trimming boot and shoe heels, the combination of the revolving circular knife with the main shaft 10, rock-shaft 13, floated as described, guiding-cam 11, cog 9, and adjustable screw-gearing 7 8, actuated as described, all operating to present the work to the revolving knife, substantially as described.

2. In machinery for trimming boot and shoe heels, the combination of the main shaft 10, rock-shaft 13, bearing the same, and floated upon spring 12, rock-bolt 14, bearing-bars $16^2$ $16^3$, slotted sliding bearing-plate 20, cam 11, clutch 23, and pins $9^1$, with the guide 41, and actuating mechanism, as described, all operating substantially as described, for the purpose set forth.

3. The combination of the rock-shaft 13, with its shoulder $12^1$, and rock-bolt 14, with the spring 12 resting on the head of the rock-bolt, surrounding the rock-shaft and abutting against the shoulder of the rock-shaft, which is floated thereon, substantially as described, for the purpose set forth.

4. The combination of the rock-bolt 14, furnishing a bearing for the rock-shaft 13, and a support for the spring 12, and its sleeve $a^1$ with the slot 15' in the frame of the machine, for the purposes of adjustment, substantially as described.

5. The combination of the main shaft with the heel-shaped cam 27, guided on the under surface of plate 28, substantially as described.

6. The combination of the main shaft 10, actuated as described, with the jack 31 36 37 38 39 40, holding the work against the heel-shaped rest projecting from the end of the shaft, and fitted to arm 31, substantially as described.

7. In a machine for trimming the heels of boots and shoes, the combination of the screw-gear 7 and 8, and slotted sliding bearing-plate 20, with the operating mechanism and cog-wheel 9, substantially as described, for the purpose set forth.

8. The combination of lever 29, rock-bar 30, and work-shaft 10, substantially as described, for the purpose set forth.

9. In a machine for trimming boot and shoe heels, the arrangement and combination of the lever 17, passing through the hole 18 in the frame of the machine, actuating the shipper 19 22, pivoted to an arm projecting from the sliding bearing-plate 20, with the clutch 23 carrying the cam 11 and pins 9', and having a horizontal movement on the main shaft, substantially as described, for the purpose set forth.

10. The combination of the main shaft, provided with the horizontal keyway 26, with the clutch 23, having a horizontal movement therein, and carrying the cam 11, and engaging-pin, substantially as described, for the purpose specified.

11. The combination of the slotted hanger $m$, and cog-wheel with the set-screw $n$, substantially as specified.

12. The combination of the bracket $c$, slotted as shown, with the set-screws $c^1$ and $c^2$, to secure a vertical adjustment of the revolving knife, substantially as described.

13. The combination of the sliding arm B, slotted as shown, with the set-screws $b^1$ $b^2$, and bracket C, to secure a horizontal adjustment of the revolving knife in relation to the work, substantially as described.

14. The guard E arranged to conform to the inner surface of the blade, to free the same from the skivings, and bolted to the knife-shaft, substantially as described.

15. The combination of the rock-shaft 13, with the weight 42 suspended over the friction-pulley 43 by cord $d$, for the purpose of drawing the main shaft into position for renewing the work upon unshipping the cam, substantially as described.

16. In a machine for trimming the heels of boots and shoes, the knife A beveled on its outer edge at A', substantially as described.

LEWIS G. CLOCK.

Witnesses:
FRANK G. PARKER,
F. F. RAYMOND.